June 27, 1944.                C. N. KIMBERLIN, JR                 2,352,268
                              RECOVERY OF ETHYL CHLORIDE
                              Filed June 18, 1943
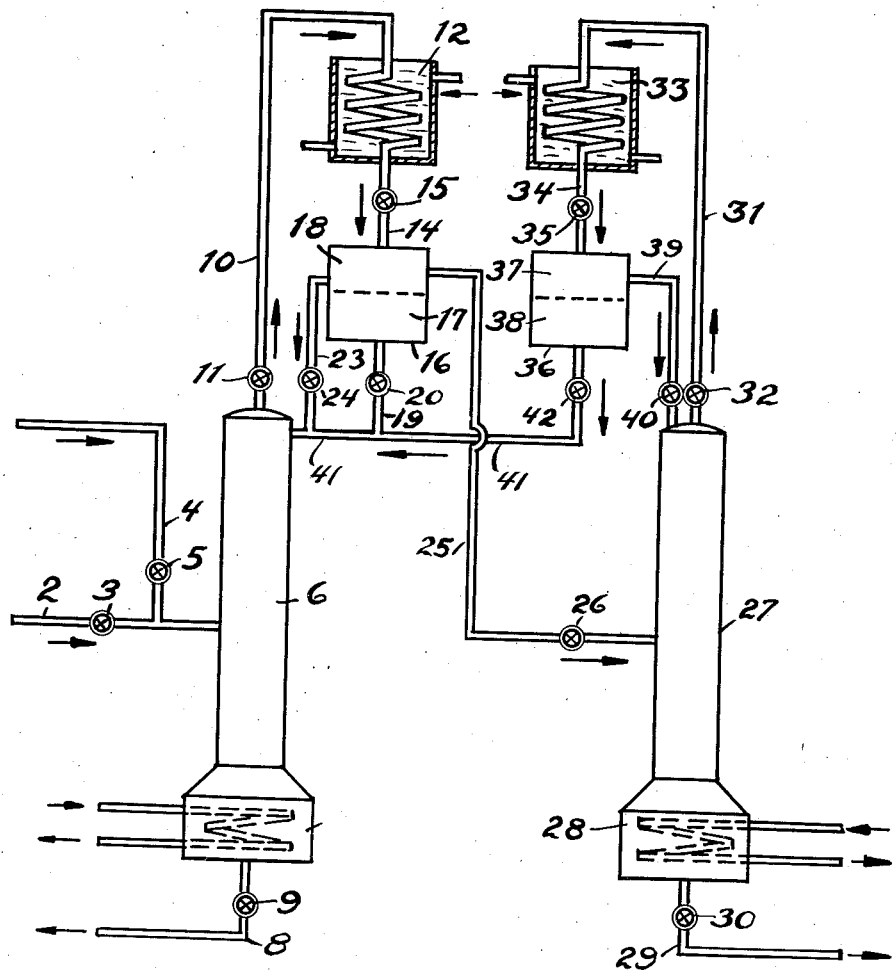
Charles N. Kimberlin, Jr. Inventor
By P. H. Young Attorney Patented June 27, 1944

2,352,268

UNITED STATES PATENT OFFICE 2,352,268

RECOVERY OF ETHYL CHLORIDE

Charles N. Kimberlin, Jr., Baton Rouge, La., assignor to Standard Oil Development Company, a corporation of Delaware Application June 18, 1943, Serial No. 491,302

8 Claims. (Cl. 202—42)

The present invention relates to a process for recovering ethyl chloride from admixtures and mixtures of normal butane by azeotropic distillation in the presence of sulfur dioxide.

In the manufacture of lead tetraethyl by the ethylation of the lead-sodium alloy with ethyl chloride, a considerable quantity of normal butane is formed from the ethyl chloride by reason of a side reaction. Aside from the loss of ethyl chloride in the formation of normal butane, there is also an additional loss due to the fact that the ethyl chloride and normal butane form an azeotropic mixture of 80 weight per cent normal butane and about 20 weight per cent ethyl chloride. This mixture has a constant boiling point of $-1°$ C. Heretofore it has been necessary to reject one part of ethyl chloride along with each four parts of normal butane formed by reason of the side reaction in order to prevent the building up of normal butane in the recycle stream during the manufacture of lead tetraethyl. The problem involved in recovering the ethyl chloride is essentially the removal of butane from the reaction system at a point where it acts as an inert diluent. Any process which separates out a quantity of butane recovers a corresponding and proportional amount of ethyl chloride even though the latter may still contain some butane. In the past, various means have been employed for the recovery of ethyl chloride and for the isolation and rejection of normal butane. Such a recovery has been accomplished by solvent extraction with aqueous alcohol as set forth in U. S. Patent No. 2,275,151, patented March 3, 1942. This process, however, has the disadvantage that it requires large quantities of aqueous alcohol, considerable operation equipment and very careful operating control.

It is an object of the present invention to provide a simple and economic method of separating butane from its azeotrope with ethyl chloride. Other objects will be apparent upon a fuller understanding of the invention hereinafter described. In carrying out the present invention, it is proposed to add sulfur dioxide to an azeotropic mixture of normal butane and ethyl chloride in order to form a mixture which, when fractionally distilled, segregates most of the normal butane from the ethyl chloride. The boiling points of the various pure compounds and their mixtures are as follows:

| Compound | Boiling point |
|---|---|
| | °C. |
| Ethyl chloride | 12.5 |
| Normal butane | 0.5 |
| Sulfur dioxide | −10 |
| Ethyl chloride-normal butane azeotrope (homogeneous) | −1 |
| Sulfur dioxide-normal butane azeotrope (heterogenous) | −18 |
| Sulfur dioxide-ethyl chloride (homogeneous) | (¹) |
| No ternary azeotrope exists | |

¹ No azeotrope.

As an example illustrating the operation of the invention, the following is submitted:

A mixture of about 313 parts by weight of normal butane, 80 parts by weight of ethyl chloride and about 108 parts by weight of sulfur dioxide was distilled through a 24 x ¾" vacuum jacketed column packed with $\frac{3}{16}$" stainless steel helices. The column was equipped with a dry ice condenser and trap in which the liquid condensate separated into two layers, the lower layer being returned as reflux to the upper portion of the column. The upper layer was partially returned as reflux and the remainder was removed from the system. The overhead distillate from this column was vaporized through soda lime prior to final condensation. After taking overhead 290.5 parts of the sulfur-dioxide-free distillate, the distillation was stopped. Analysis of the distillate by liquid density indicated this to be pure normal butane and when this distillate was burned in a Bunsen burner the flame was colored only a slight green by the introduction of a copper wire, indicating the gas to be almost entirely halogen free. Upon removal of sulfur dioxide from the bottoms there were obtained 95.5 parts of material which consisted of 82 weight per cent ethyl chloride and about 18 weight per cent normal butane.

Although in this example soda lime was employed for the removal of any sulfur dioxide coming overhead with the normal butane, any convenient method for the removal of the sulfur dioxide may be employed. The distillate may be water- or caustic-washed but the preferred method is to separate by fractional distillation the sulfur dioxide from the normal butane. This will be described in detail later in connection with the accompanying drawing. This latter method of separating sulfur dioxide from the normal butane has also the advantage that very little sulfur dioxide is spent or used up in the operation. It can be recovered from the distillation system and re-introduced into the azeotropic normal butane-ethyl chloride mixture being fed to the first fractionating column so that the only fresh sulfur dioxide required for the system is that representing the usual small distillation losses. Although in the specific example a vacuum jacketed column was employed, in a large scale operation according to the process of the present invention it is desirable to operate under sufficient pressure so that water cooling can be utilized rather than special refrigeration in the condensing of the distillate coming overhead.

The accompanying drawing illustrates in more or less diagrammatical sectional elevation a suitable equipment set-up for successfully operating the present invention. The normal butane-azeotropic mixture is fed by means of line 2 and open valve 3 into still column 6 having admixed therewith sulfur dioxide which is introduced into the system through line 4 controlled by valve 5. Reflux is maintained and fractional distillation set up in column 6 by means of reboiler or heat supply 7. The overhead vapors through line 10 controlled by valve 11 and comprising essentially normal butane together with sulfur dioxide as an azeotropic mixture are distilled and condensed in cooler 12 and conducted to separator 16 by means of line 14 controlled by valve 15. In this separator 16 two liquid phases result. The lower one 17, being rich in sulfur dioxide and containing normal butane, is returned to still column 6 by means of line 19, open valve 20 and line 41. A portion of the upper layer 18 may also be returned by means of line 23 controlled by valve 24 and by means of line 41 to the top of still column 6 to serve as reflux condensate. The upper layer 18 is rich in butane but contains dissolved sulfur dioxide and that portion which is not returned to column 6 is conducted by means of line 25 controlled by valve 26 into still column 27 which has a reboiler 28. The overhead passing through line 31 controlled by valve 32 is the azeotropic mixture of normal butane and sulfur dioxide which is then passed through cooler 33 and conducted by means of line 34 controlled by valve 35 into separator 36 wherein an upper layer 37, rich in butane, is conducted back as reflux condensate through line 39 controlled by valve 40 to the still column 27. The lower layer 38 is rich in sulfur dioxide and is conducted by means of line 41 controlled by valve 42 as reflux condensate to the first fractionation system, namely, still column 6. Substantially pure normal butane is withdrawn as bottoms from still column 27 through line 29 controlled by valve 30 and substantially pure ethyl chloride is withdrawn from still column 6 as bottoms through line 8 controlled by valve 9. It is believed that the excess sulfur dioxide in the top of still column 6 descends this column and acts as a selective solvent, thus further aiding in the separation of ethyl chloride from the butane. As with any other distillation process, however, the degree of separation obtained depends upon the efficiency of the fractionating system, the number of plates and the particular temperatures and pressures employed. An efficient separation in column 6 would provide for 10 or more plates with the column being operated at a bottoms temperature of 10° C. to 100° C. and a top temperature of −20° C. to 80° C., under 1 to 20 atmospheres pressure, while for an efficient operation of column 27 there would be provided 10 or more plates with the bottoms temperature being 0° C. to 90° C. and the top temperature being about −20° C. to 80° C.

In addition to recovering ethyl chloride, this process also provides for the efficient recovery of normal butane from it as the by-product of the lead tetraethyl process. This may be used as fuel or further purified and employed in a variety of ways such as, for example, a feed stock to an isomerization unit to produce isobutane, or it may be employed as a blending agent in adding volatility to motor fuels, etc. Also the butane can be used as a fuel if the last traces of ethyl chloride are first removed therefrom.

Having thus fully described and illustrated the nature of the invention, what is desired to be secured by Letters Patent is:

1. A process for the separation of a butane-ethyl-chloride mixture into its component parts which comprises subjecting said mixture to an azeotropic fractional distillation with sulfur dioxide.

2. A process which comprises separating an azeotropic mixture of normal butane and ethyl chloride into its component parts by fractional distillation of said mixture with the aid of sulfur dioxide and separately recovering normal butane and ethyl chloride as bottoms.

3. A process as in claim 2 wherein the overhead from the fractional distillation is condensed, separated into two layers, and the upper layer separately subjected to a second fractional distillation from which normal butane is recovered as bottoms.

4. A process as in claim 2 wherein the overhead from the fractional distillation is condensed, separated into two layers, the upper layer separately subjected to a second fractional distillation from which normal butane is recovered as bottoms and in which the lower portion of the condensed distillate from the second fractional distillation, said distillate being rich in sulfur dioxide, is returned as reflux condensate to the first fractional distillation system.

5. A process which comprises fractionally distilling an azeotropic mixture of ethyl chloride and normal butane with the addition of sulfur dioxide thereto to produce an overhead of normal butane and sulfur dioxide, condensing said overhead, stratifying said condensate to an upper butane-rich layer and a lower sulfur-dioxide-rich layer, returning the lower layer to the distillation as reflux condensate, conducting at least a portion of the upper layer to a secondary fractional distillation, condensing the overhead therefrom, stratifying said condensate into an upper butane-rich layer and a lower sulfur-dioxide-rich layer, returning the upper layer to the second fractional distillation as reflux condensate, conducting the lower layer to the first-mentioned fractional distillation and recovering ethyl chloride as bottoms from the primary distillation and normal butane as bottoms from the secondary distillation.

6. A process as in claim 5 wherein a minor portion of the upper layer condensate from the primary distillation is returned to the primary distillation as reflux condensate.

7. A process as in claim 5 wherein the overhead vapors from the secondary distillation are combined with the overhead vapors from the primary distillation.

8. A process which comprises separating an azeotropic mixture of normal butane and ethyl chloride into its component parts by fractionally distilling said mixture with the aid of sulfur dioxide, condensing the overhead vapors and stratifying the same into an upper layer rich in normal butane and a lower layer rich in sulfur dioxide, and recovering normal butane from the upper layer and ethyl chloride as bottoms.

CHARLES N. KIMBERLIN, Jr.